Feb. 13, 1940. L. J. PAGE 2,189,961
ADJUSTABLE NOSE PAD MOUNTING FOR RAISING AND LOWERING BIFOCAL LENSES
Filed March 15, 1938
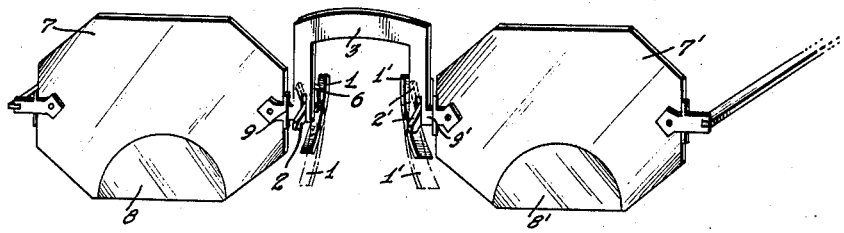
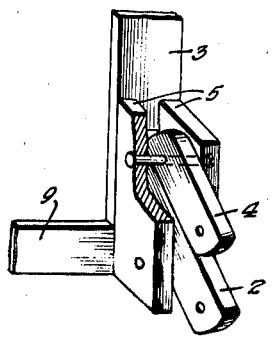
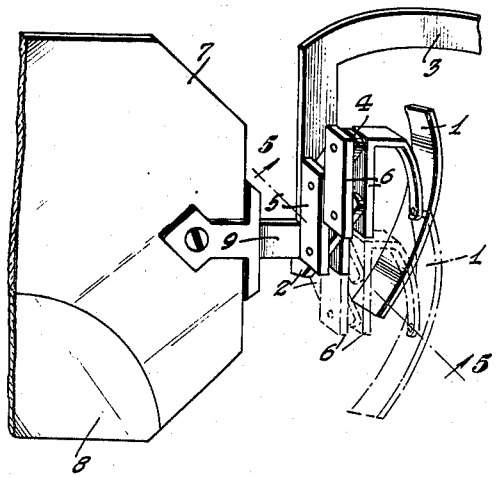
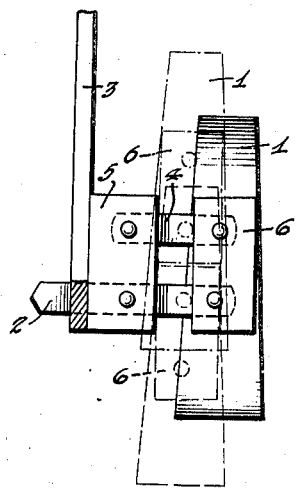
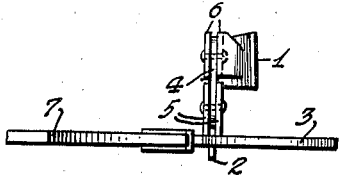
Inventor:
Louis John Page Patented Feb. 13, 1940

2,189,961

UNITED STATES PATENT OFFICE 2,189,961

ADJUSTABLE NOSE PAD MOUNTING FOR RAISING AND LOWERING BIFOCAL LENSES

Louis John Page, Hollis, N. Y.

Application March 15, 1938, Serial No. 195,933

7 Claims. (Cl. 88—49)

The adjustable feature of the bifocal mounting allows the wearer to raise the eyeglasses or spectacles so that the reading section of the lenses is on a level with the eyes when the eyes are being used for near vision; and to lower them before the eyes when they are used for distant vision.

The adjustable bifocal mounting is a bridge which may be fitted to rims holding lenses or to straps which fit directly to the lenses.

The object of my invention is to improve the means of raising and lowering the nose pads of the bridge by a novel construction of the arm supporting the nose pads.

Another object of my invention is to make an adjustable bridge without affecting the general appearance of bridges now in use.

Another object of my invention is to lend itself to manufacturing more readily, and to make the manipulation of the bridge easier.

Figure 1 is a front perspective view of a pair of spectacles equipped with the adjustable bifocal bridge.

Figure 2 is a top view of part of the bridge showing one of the pad supporting arms.

Figure 3 is a rear perspective view of one pad and arm, showing part of bridge and detail of construction.

Figure 4 is a rear perspective view of part of the adjustable pad arm, part in section, with the pad and pad support end removed.

Figure 5 is a section taken on line 5—5 of Figure 3.

Referring to Figure 1 the vertical members of bridge 3 have extremities 9 and 9' which support the bifocal lenses 7 and 7' with straps and screws. The nosepads 1 and 1' are shown in alternate positions. The solid line pads are positioned to allow the lenses to be lowered. The dash line pads show their position to raise the lenses for reading or close use. The pad arm 6 connects the pad 1 to the pad supporting unit. The reading sections of the lenses 7 and 7' are designated as 8 and 8'. The rotating bars 2 and 2' have extensions which are a means of controlling the raising and lowering of the pads 1 and 1'. The bridge 3 is slotted vertically at the lower ends of the vertical members to allow the movement of the arms 2 and 2' vertically.

Referring to Figure 2 the bridge 3 is shown attached to lens 7, the bridge support 5 attached to inner part of the bridge 3, the pad support 6 connected to support 5 by bars 4 and 2, the ends of which are rotatably mounted to each support near their upper and lower ends. The ends of bars 4 and 2 fit between the sides of the supports 5 and 6 tight enough so that a slight pressure is needed to rotate the bars.

Referring to Figure 3 the bridge 3 has a stud 9 which supports the lens 7 by means of straps and a screw. The rear lower part of bridge 3 is attached to the bridge support 5, which consists of two plates drilled near their upper and lower ends to accept pins, rivets or the like, which pass through holes in the connecting bars 2 and 4. The free end of these bars connect to the pad support arm 6 consisting of two plates similarly drilled as support 5 and connected to bars 2 and 4 by pins, screws or the like, permitting a rotatable movement. One side of the pad support 6 is connected to the nosepad 1. The solid line pad shows the pad in a raised position and the dash line pad shows the pad in a lowered position.

Referring to Figure 4 the bridge 3 is shown with the bridge support 5 attached and the connecting bars 2 and 4 are shown positioned to lower the pads. The sectional part shows the construction more fully, demonstrating a means of connecting the bar 4 to bridge support 5. The sides of bridge support 5 compress the sides of bar 4 sufficiently to cause friction.

Referring to Figure 5 the bridge 3 is shown attached to bridge support 5; the bars 2 and 4 are rotatably or pivotally attached to supports 5 and 6 by means of pins, rivets, or screws. The solid line pad 1 is in position between the raised and lowered positions, whereas the dot and dash line pads are shown in raised and lowered positions. It is to be noted that the pad 1 is further from the inner side of the bridge 3 when in a central position than when raised or lowered; thus when the glasses are held to the face by temples or other means the nosepads are held in either up or down positions. The movement of the pad up or down is limited by the contacting of the sides of the supports 5 and 6 and of the bars 2 and 4. The pads are also held in position by friction of the sides of the bridge support 5 and the pad support 6 against the sides of the connecting bars 2 and 4. To increase this friction the arms 2 and 4, when in a central position, can be bent thus causing a slight curve in the bars 2 and 4. This curve has a tendency to straighten out as the bars 2 and 4 are moved up or down, increasing tension against the sides of the supports 5 and 6, as the pads are raised or lowered, thereby maintaining their new positions.

The supports 5 and 6 can be made of single plates and rotatably mounted to 2 and 4 similar to the ones shown in this invention. The best results are attained when the holes near the ends of supports 5 and 6 and in the bars 2 and 4 are equally spaced, but results can be attained when this is not done. The sides of the supports 5 and 6 and the bars 2 and 4 can be smooth, rough, notched, and also have various curves to better lend themselves to functioning and design. Although this invention shows the bars 2 and 4 projected away from the bridge, they can be made to project toward each other or any other angular projection.

A novel feature of the two bar construction is that the vertical or long axis of the nosepad maintains the same angular inclination with the plane of the bridge in its various adjusted positions. Thus it can be seen that the nose pad rests substantially in the same place on the nose in any position to which the lenses may be adjusted.

The adjustment of the lenses is made by holding the glasses by one lens in one hand and pushing up or down on the extensions of the bars 2 and 2' for raised or lowered positions. The bars 2 and 2' can be made without the extensions similar to the bars 4 and 4'; in this case the bridge is not slotted and has none of the mechanism showing in the front. To adjust this type only one hand is necessary. The bridge is held between the fingers, pulled slightly away from the nose and pressed up, pushing the nose pads against the bony structure just above the bridge of the nose. The pads are now lowered relative to the lenses and placed in their resting place. To lower the position of the lenses the bridge is pressed out and down and in again.

I am aware that prior to my invention spectacle bridges have been patented for the purpose of raising and lowering the position of lenses, but as the construction of my invention is new and has certain novel features I do claim:

1. In an ophthalmic frame or mounting, a bridge, means for attaching lenses to said bridge, nose pads, means for attaching said nose pads to said bridge, said attaching means comprising an arm composed of two bars, the ends of said bars mounted pivotally between two sets of plates forming a parallelogram, one set of said plates being attached to said bridge in a manner that the plane of the parallelogram is vertical and substantially perpendicular to the plane of the bridge, the opposite set of plates having a projection fitted to the nose pad, said nose pad releasably secured in position by friction of the bars against the plates and limited in swing by the contacting of the opposed plates, said nose pad axis maintaining same angular relationship to plane of glasses in various positions.

2. In an ophthalmic frame or mounting, a bridge, means for attaching lenses to said bridge, nose pads, means for attaching said nose pads to said bridge, said attaching means comprising an arm composed of two bars mounted pivotally between two sets of plates forming a parallelogram, one set of said plates being attached to said bridge vertically, an extension on one of said bars protruding through said bridge forming a finger control, said control bar when in a central position directed substantially perpendicular to the plane of the bridge, the opposite set of plates having a projection fitted to the nose pad, said nose pad releasably secured in position by friction of the bars against the plates and limited in swing by the contacting of the opposed plates, said nose pad axis maintaining same angular relationship to the plane of the glasses in various positions.

3. In an ophthalmic frame or mounting, a bridge, means for attaching lenses to said bridge, nose pads, means for attaching said nose pads to said bridge, said attaching means comprising an arm composed of two parallel curved bars mounted pivotally between two sets of parallel plates forming a parallelogram structure, one set of said plates attached vertically to said bridge so that opposite set of plates is distant to said bridge, said second set of plates having a projection fitted with the nose pad, said curved bars tending to straighten when rotated between plates at limit of travel, releasably securing bars in place by increased friction of bars against plates, thereby releasably securing glasses in a predetermined position.

4. In an ophthalmic frame or mounting, a bridge, means for attaching lenses to said bridge, nose pads, means for attaching said nose pads to said bridge, said attaching means comprising an arm composed of two parallel curved bars mounted pivotally between two sets of parallel plates forming a parallelogram structure, one set of said plates being attached vertically to said bridge, an extension on one of the bars passing through an opening in said bridge, said extension terminating in a finger control, the opposite set of plates having a projection fitted to the nose pad, said nose pad being raised or lowered by collapsing said arm by means of said finger control, releasably securing said bars within said plates at limit of travel by increased friction of the bars against the plates thereby releasably securing glasses in a predetermined position.

5. In an ophthalmic frame or mounting, a bridge, means for attaching lenses to said bridge, nose pads, means for attaching said nose pads to said bridge, said attaching means comprising an arm composed of plates and bars alternately connected pivotally in the form of a parallelogram, one of the plate sides of said parallelogram being attached vertically to said bridge, an extension on one of the bars passing thru an opening in said bridge at right angles to the plane of the bridge, said extension terminating in a finger control, the opposite plate having a projection fitted to said nose pad, the glasses being adjusted to a predetermined position by manipulation of said finger control and releasably secured by friction of the bars against the plates and limited in travel by contacting of plates.

6. In an ophthalmic frame or mounting, a bridge, means for attaching lenses to said bridge, nose pads, means for attaching said nose pads to said bridge, said attaching means comprising an arm composed of two bars, the ends of said bars pivotally mounted between sets of opposed plates in the design of a parallelogram, one set of said plates being attached to said bridge vertically, the bars directed normal to the plane of the bridge, the opposite set of plates having a projection fitted to the nose pad, said nose pad adjustable vertically in respect to said bridge by collapsing said arm, and releasably securing said nose pad in position by co-operating parts of said arm.

7. In an ophthalmic frame or mounting, a bridge, means for attaching lenses to said bridge, nose pads, means for attaching said nose pads to said bridge, said attaching means comprising an arm composed of two bars, the ends of said bars pivotally mounted between opposed plates in the design of a parallelogram, one set of said plates being attached to said bridge vertically, an extension on one of said bars protruding to the front of said bridge forming a finger control, the opposite set of plates having a projection fitted to the nose pad, said nose pad adjustable vertically in respect to said bridge by collapsing said arm by manipulating said finger control, and releasably securing said nose pad in position by cooperating parts of said arm.

LOUIS JOHN PAGE.